United States Patent [19]

Parulski

[11] Patent Number: 5,555,098
[45] Date of Patent: Sep. 10, 1996

[54] METHOD AND APPARATUS FOR PROVIDING MULTIPLE PROGRAMMED AUDIO/STILL IMAGE PRESENTATIONS FROM A DIGITAL DISC IMAGE PLAYER

[75] Inventor: Kenneth A. Parulski, Rochester, N.Y.

[73] Assignee: Eastman Kodak Company, Rochester, N.Y.

[21] Appl. No.: 233,540

[22] Filed: Apr. 26, 1994

Related U.S. Application Data

[63] Continuation of Ser. No. 803,245, Dec. 5, 1991, abandoned.
[51] Int. Cl.$^6$ ..................................................... H04N 5/76
[52] U.S. Cl. ........................... 358/341; 358/342; 358/343; 358/906; 360/33.1; 360/19.1; 360/72.1
[58] Field of Search .................................... 358/335, 341, 358/342, 343, 906, 909.1; 360/33.1, 19.1, 72.1, 72.2; H04N 5/76, 5/781

[56] References Cited

U.S. PATENT DOCUMENTS

| | | | |
|---|---|---|---|
| 4,672,471 | 6/1987 | Gouda | 358/341 |
| 4,675,755 | 6/1987 | Baumeister et al. | 358/909 |
| 4,777,537 | 10/1988 | Ueno et al. | 358/341 |
| 4,847,698 | 7/1989 | Freeman | 358/343 |
| 4,924,303 | 5/1990 | Brandon et al. | 358/143 |
| 5,010,417 | 4/1991 | Yoshio et al. | 358/341 |
| 5,122,886 | 6/1992 | Tanaka | 358/335 |
| 5,130,815 | 7/1992 | Silverman et al. | 358/341 |
| 5,218,455 | 6/1993 | Kristy | 340/273 |
| 5,233,438 | 8/1993 | Funahashi et al. | 358/341 |
| 5,241,659 | 8/1993 | Parulski et al. | 358/335 |

Primary Examiner—Thai Q. Tran
Assistant Examiner—Khoi Truong
Attorney, Agent, or Firm—David M. Woods

[57] ABSTRACT

An apparatus and method are provided for use with a system including a digital data base for storing digitized images and digitized audio messages, for controlling concurrent reproduction of digitized images on an image reproduction device and audio information on a sound reproduction device. The digitized images are stored as image data files in the digital data base. Likewise, the digitized audio messages are stored as audio data files in the data base. Audio messages and images are associated with each other. This is accomplished by means of a presentation sequences file stored in the data base or in a separate EEPROM memory. In response to a user command, a controller causes image data and audio data for a selected image and an accompanying audio message to be read from the data base. The respective data are provided to the image reproduction device and the sound reproduction device, respectively, whereby the audio message is played back by the sound reproduction device as the image is displayed on the image reproduction device. A controller maintains the display of the image for the duration of the audio message. The controller reads a sequence of images and audio messages from the data base and displays each image and plays back one or more associated audio messages in turn.

39 Claims, 5 Drawing Sheets

METHOD AND APPARATUS FOR PROVIDING MULTIPLE PROGRAMMED AUDIO/STILL IMAGE PRESENTATIONS FROM A DIGITAL DISC IMAGE PLAYER This is a Continuation of application Ser. No. 07/803,245, filed Dec. 5, 1991 now abandoned.

FIELD OF THE INVENTION

The present invention generally relates to the storage and reproduction of digitized sound and images, and is particularly directed to a method and an apparatus for reproducing digitized photographic images on a display monitor and playing back audio information concurrently with display of such images.

BACKGROUND OF THE INVENTION

Copending application Ser. No. 582,305, filed Sept. 14, 1990, entitled "Multiresolution Digital Imagery Photofinishing System", by S. Kristy, assigned to the assignee of the present application and the disclosure of which is herein incorporated, describes a digital image processing system wherein photographic still images, such as those captured by way of a 35 mm camera, are digitized and recorded on an optical compact disc (CD), for subsequent playback on a CD player. Image data files are created by scanning the images on a roll of developed photographic film to produce digitized pixel data for the images, and storing the pixel data as image data files. A relatively permanent digital storage medium, such as an optical disc readable by a laser pickup, is then produced. A user having such a disc loads the disc into a disc player coupled to a display unit such as a video monitor or television. Then, by entering suitable commands into the disc player or a separate control unit, the user displays selected images on the display unit.

A low cost, reduced complexity frame store/data retrieval architecture, incorporated into a CD player and which provides for rapid call-up of images stored as digitized image data and display of the images on a consumer television color monitor, is described in a co-pending United States patent application, Ser. No. 583,265, filed Sept. 14, 1990, entitled "Mechanism for Controlling Presentation of Displayed Image". A presentation control file in the data base corresponds with each image data file. The presentation control file contains orientation and aspect ratio information, so that the image playback device will know how each image has been stored on the database and will therefore know how to access the stored image so that it is played back in a proper upright condition.

The presentation control file included in the database, which is typically recorded using a write-once optical disc and cannot be altered by a conventional CD player, can be augmented or superseded by image parameter data stored in by a separate storage medium, such as an electrically-programmable read only memory module. Such a module may be either fixed inside the CD player or may alternately be removable from the player, and may be configured to store customized image display parameters including contrast, image magnification, color balance, etc., as described in a co-pending U.S. patent application, Ser. No. 07/582,727, now U.S. Pat. No. 5,246,659, filed Sept. 4, 1990, entitled "Auxiliary Removable Memory for Storing Image Parameter Data" by K. Parulski et al, assigned to the assignee of the present invention and the disclosure of which is herein incorporated.

More particularly, this application discloses an improved storage and retrieval mechanism for a digital image processing system wherein a plurality of photographic images that have been captured on a photographic film strip are digitized for processing and subsequent display. Digitized images are stored on a digital data storage recording medium, such as a compact disc, which is capable of being coupled to an image playback device for reproduction of a digitized image on a display such as a color TV monitor. A photofinisher having suitable equipment scans developed film and produces an optical disc, and then provides the disc to the customer along with the developed film.

Subsequently, when the customer inserts the disc into a playback device, such as a compact disc player, for driving an output display, such as a color TV monitor, the playback device decodes the presentation control file information in the course of reading out the digitized image, and uses the presentation control file to control the playback device in such a way as to display the image in an upright orientation and at the correct aspect ratio for the display. If the aspect ratio is such that the dimensions of the image do not match the dimensions of the display, a border generator fills in non-accessed pixel addresses to complete the image on the display.

In various applications in which multimedia information is to be conveyed, it would be desirable to provide synchronized images and audio messages. For instance, in a museum, a display includes a plurality of still images such as color slides and corresponding audio messages, such as narration, sound effects, etc. As another example, a sales demonstration may include a series of images accompanied by sound tracks or voiceovers which vary in language, content, etc., depending on the market which is to be targeted. Furthermore, it would be desirable to be able to easily rearrange the images and audio segments into a variety of different sequences, which may be appropriate for different audiences, or in response to different user inputs, for example, from different push-buttons in a museum walk-up display.

Audio information such as voice, music, sound effects, etc., can also be stored in digital form and played back on a separate audio system. However, it is difficult to synchronize separate audio and image systems, particularly if the systems together are to provide different associated images, audio messages, etc., and difficult to allow for convenient editing, such as resequencing audio messages and images, or changing the audio message with which an image is associated, in such a system. Also, if separate audio and video display systems are used for a multimedia presentation, the cost and bulk of the two separate systems are undesirably large.

SUMMARY OF THE INVENTION

In order to provide a convenient, self-contained system for displaying images and concurrently playing back associated audio messages, there is provided an apparatus, for use with a system including a digital data base for storing respectively corresponding digitized images and digitized audio messages, for controlling concurrent reproduction of digitized images on an image reproduction device and audio information on a sound reproduction device.

The digitized images are stored as image data files in the digital data base. Likewise, the digitized audio messages are stored as audio data files in the same data base. In accordance with the invention, audio messages and images may be associated with each other. This is accomplished by means of a mapping arrangement, which may include a mapping table including addresses or IDs of pairs of associated images and audio messages or IDs of associated files stored in headers or presentation control files associated with the image and audio data files.

In particular, an application of the invention for conveying information on a given subject, involves displaying a sequence of images, each with its own corresponding audio message. The system includes a library of images and audio messages large enough to encompass several sequences of slides and audio messages. In some cases, a single image appears in two different sequences on two different subjects, having different corresponding audio messages, or vice versa. To allow for individual image viewing, information editing, etc., the system is not limited to sequences of images and audio messages stored in contiguous addresses of the data base. Rather, the system includes means, such as a *utility table in the data base, for selecting any image or images, without regard to the sequence in which the images are stored in the data base, and for reading and playing back an associated audio message while each image is displayed.

Responsive to a user command, a controller causes image data and audio data for a selected image and an accompanying audio message to be read from the data base and loaded into respective image and audio memories. The respective data are provided to the image reproduction device and the sound reproduction device, respectively, whereby the audio message is played back by the sound reproduction device as the image is displayed on the image reproduction device. A controller maintains the display of the image for the duration of the audio message. The controller reads a sequence of images and audio messages from the data base, one image and one message at a time, and displays each image and plays back each message in turn.

Such a system provides numerous advantages for the user. Any desired association between the images and the audio messages is available. That is, a given image may be is associated with more than one audio message, and vice versa. The system is then able to provide information to two different audiences, a different audio message being directed to each audience. Also, if a library of image data files and a library of audio data files are stored in the data base, pairing up different audio messages with different images only requires editing a presentation sequences file contained in an EEPROM memory in which IDs of the paired files are stored. While, in many cases, the data bases are stored on media such as digital compact discs which cannot be overwritten or edited, it is simple to edit the presentation sequences contained in EEPROM memory.

The present invention allows for arranging subsets of the images and audio messages to be grouped into sequences. A sequence of images and audio messages having related subject matter are displayed in sequence, responsive to a simple user command, such as pushing a push button. A controller which controls the reading, displaying, and playback of the images and audio messages stored as data files in the data base includes programming for reading, displaying, and playing back a sequence of such images and audio messages.

DETAILED DESCRIPTION

In accordance with the invention, digitized images and audio information are stored as image and audio data files in the manner of a library in a digital storage medium, i.e., data base. This data base is preferably an optically encoded compact disc. Audio messages may be associated with images, such that the audio message is played back while the image is displayed, in a manner to be discussed. Once such a library is programmed onto the write once digital storage medium, it is normally impossible to change the contents of the digital storage medium.

Accordingly, a preferred digital storage medium is a digital disc having data encoded thereon to be read optically, such as a compact disc similar to those commonly used for recording music and, increasingly, computer data. Of course, the method and apparatus according to the invention are not limited to compact disc applications, but could be practiced with other mass storage media as well. In a preferred mode for practicing the invention, a user provides images and audio messages to be encoded onto a disc using suitable equipment at a facility set up for programming such discs.

Figure 1:
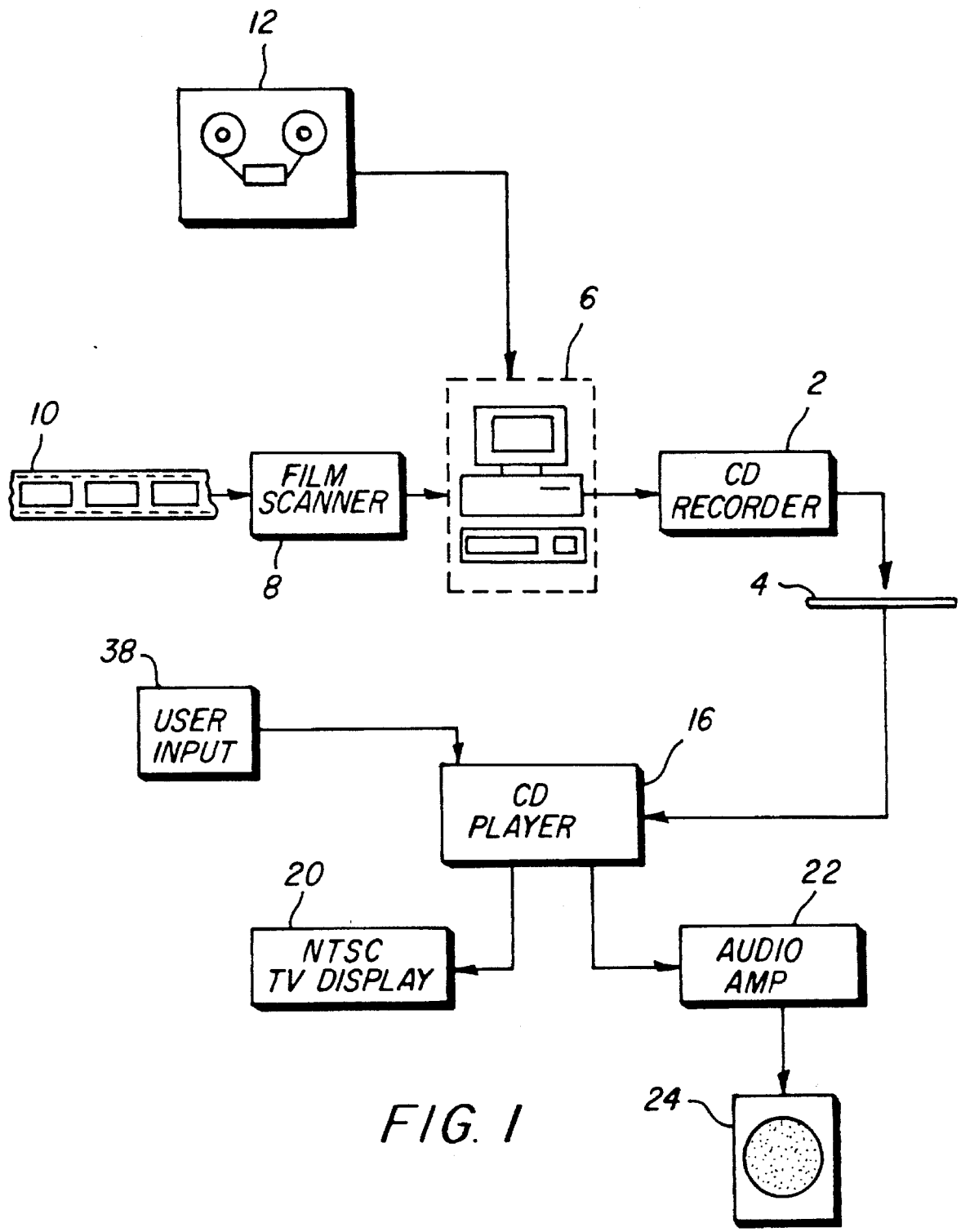
FIG. 1 is a system block diagram showing both a recording system for writing image and audio information onto a digital storage medium (i.e., a compact disc) and a playback system for reading the information to display images and play back audio messages.

FIG. 1 is a simplified block diagram showing a compact disc 4 which serves as a data base for digitized images and audio messages stored as image data files and audio files thereon. There is also shown both a system for encoding the disc 4 and a playback system for displaying the digitized images and playing back the audio messages.

A disc programming system, shown in the upper half of FIG. 1, resides at the facility of a photofinisher or a sound studio. In the former case, a customer delivers a roll of film to be developed, along with audio messages recorded on a suitable medium such as audio tape. In the latter case, the customer provides developed film bearing the images to be digitized, and an audio technician assists in recording the audio messages.

The programming system includes a recording device, shown as a CD (compact disc) recorder 2, which records information onto the CD 4. The recorder 2 is controlled by a controller shown as a user interactive workstation 6, which includes a computer, a monitor, and suitable software and interfaces.

The workstation 6 is coupled to receive image data from an image data source shown as a film scanner 8, which reads images from a film strip 10. The scanner includes a suitable color sensing device for scanning a selected film image as an array of pixels and producing color pixel signals. This sensing device preferably includes a CCD (charge coupled device) array having suitable color filtering for sensing a set of primary colors. The scanning device produces digitized pixel data representative of the magnitudes of each primary color at each pixel location.

The workstation 6 is also coupled to receive audio data from an audio data source shown as an audio tape deck 12. Prerecorded audio messages, including voice, music, sound effects, or a combination thereof, depending on the application, are made in a suitable recording studio. Alternatively, the customer may make the recordings himself on home audio equipment. A master tape bearing the audio messages is then played on the tape deck 12. If the audio messages on the tape are analog, then suitable A/D conversion is made.

The controller 6 programs the digitized audio messages and images as audio and image data files on the disc 4. In accordance with conventional arrangements for storing data files on mass storage systems, the files are named, i.e., assigned IDs, and are addressable on the disc. Suitable utility files are provided for accessing desired ones of the image and audio data files by address. Such files are created by the controller 6 under operator command and programmed onto the disc 4 by the recorder 2. In accordance with the invention, however, utility files can also include presentation sequences files used for the purpose of defining associations between image and audio data files, so that while a selected image is displayed, an associated audio message is played back. Furthermore, the image presentation order and the association between image and audio data contained in the utility file on the disc 4 can be superseded by programming a different order or associations into an EEPROM memory located in the player 16. How this is done will be described below.

FIG. 1 additionally shows a playback system in accordance with the invention for displaying images and playing back associated audio messages. The playback system is preferably a commercial CD player which may be coupled by the customer/user to a display device such as a television for displaying the images. The associated audio messages may be played back through the audio system of the television. If a multimedia presentation is to be directed to a large audience or presented in a noisy environment, the associated audio messages may be played back through a public address system or an audio playback system such as a home stereo system, which are also coupled to the CD player as appropriate.

To operate the system, the disc 4 is inserted inside a CD player 16. User commands directing selected images to be displayed and associated audio messages to be played back are entered through a user control 18. Image data from the image data file read from the disc 4 is provided by the player 16 to a display device shown as an NTSC television display 20.

As per the user control, the audio data file associated with the image data file is also read, and the audio data is provided to an audio playback system, which may be the audio system of the television display, or a separate audio or public address system. The audio playback system is shown as including an audio amplifier 22 and a loudspeaker 24.

Figure 2:
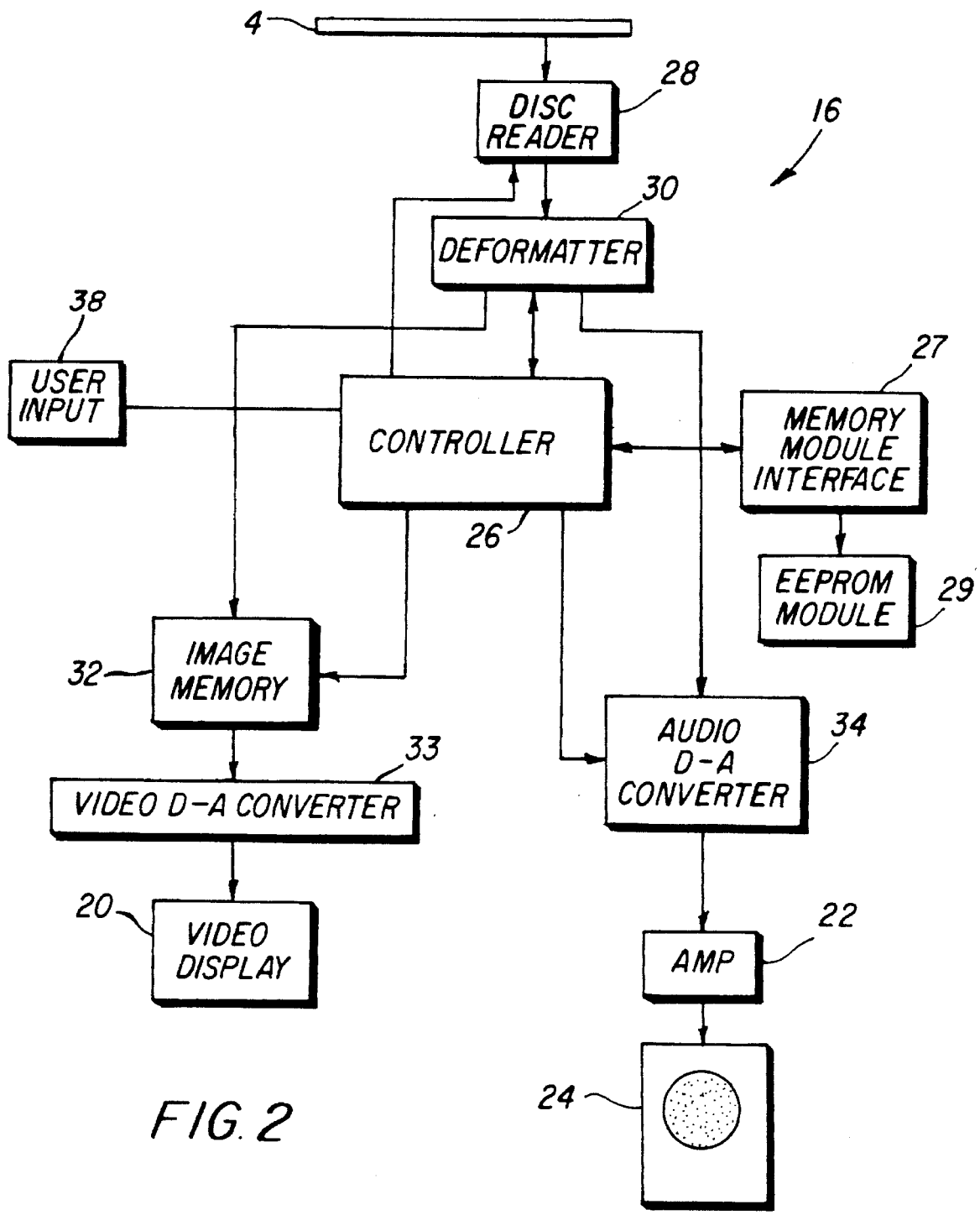
FIG. 2 is a more detailed block diagram of the playback system of FIG. 1.

Turning now to FIG. 2, there is shown a more detailed block diagram of the playback system shown on the bottom part of FIG. 1. Corresponding components are numbered similarly. FIG. 2 primarily shows a more detailed block diagram of the CD player 16 of FIG. 1. The player 16 includes a controller 26. Responsive to user commands (discussed below), the controller 26 causes selected information to be read from the disc 4. The CD player preferably includes a disc reader 28, having a laser pickup movable across the face of the disc 4 (e.g., radially) for scanning a desired portion of the face of the disc 4 to read information from a desired address. A conventional motor apparatus is employed for rotating the disc 4, and for moving the laser pickup across the face of the disc 4 to access a desired portion thereof. The information read from the disc includes image and audio data files themselves, and utility files containing address information for the image and audio data files. Also, as will be discussed below, information about associations between image and audio data files is read.

Image and audio data files read from the disc 4 are provided to a deformatter 30, which strips off headers or other overhead from the files which were read. There remains only digitized image pixel information, or audio samples, depending on the type of file which was deformatted. The pixel information and audio samples are, respectively, written into an image memory 32 and an audio D-A converter 34. Image memory 32 may be implemented as read/write random access memory (RAM).

As described above, the image data from memory 32 is provided to the display 20 under control of the controller 26. Interface components for converting the digital image into an analog video format appropriate for the display 20 are included within video D-A converter 33.

Also, the audio data is supplied from the audio D-A converter 34 to the audio system, which includes the amplifier 22 and the loudspeaker 24. The controller 26 keeps track of the time required for playing back the entire audio message. This way, the controller 26 maintains the image on the display 20 for the length of time required for completing the audio message.

The playback system includes a commercial compact disc player which may be used in the user's home, coupled to a standard television. In this case, the compact disc player is controlled through its front panel or through a remote control coupled, for instance by an infrared beam, to the disc player.

In other applications, such as a public display in a museum or trade show, simplified controls for members of the public or audience passing by are provided. An example of such a simplified control is described in a co-pending U.S. patent application Ser. No. 695,149, filed May 3, 1991, entitled "A Selector for A Display Device" by J. Weldy, assigned to the assignee of the present invention and the disclosure of which is herein incorporated. For instance, a user input 38 includes a plurality of push buttons corresponding with various images and associated audio messages. A user simply pushes a button labeled for a desired subject. Responsive to the user pushing the button, the controller 26 directs the reader 28 to read appropriate image and audio data files whose contents relate to the desired subject. The system then operates as described above to display the image and play back the audio message.

In accordance with the invention, the image and audio data files are associated with each other in a presentation sequences file located either on the disc 4 or in the EEPROM memory module 29. This is done in order to provide for a multimedia presentation, in which images and audio messages which were produced to correspond with each other are displayed and played back concurrently with each other. A storage medium such as a digital compact disc has a storage capacity large enough to include many images and audio messages. Depending on the application, conveying desired information includes displaying a sequence of images, and playing back a corresponding sequence of messages. Preferably, a user should be able to view a sequence of images by pushing a single button once. The user is given a choice of several buttons, each one corresponding to a different sequence of images and audio messages. In some cases, a given image appears in different sequences, or requires a different associated audio message for each sequence in which it appears. From this summary of desired features in such a system, it will be appreciated that flexibility is an important objective.

Therefore, in accordance with the invention, a method is provided for mapping image and audio data files together, i.e., for associating image and audio data files stored on the disc 4. A suitable apparatus for supporting the method, such as suitable presentation sequences files on the disc 4 or in the EEPROM memory module 29 for facilitating association between image and audio files, is also provided.

Figure 3:
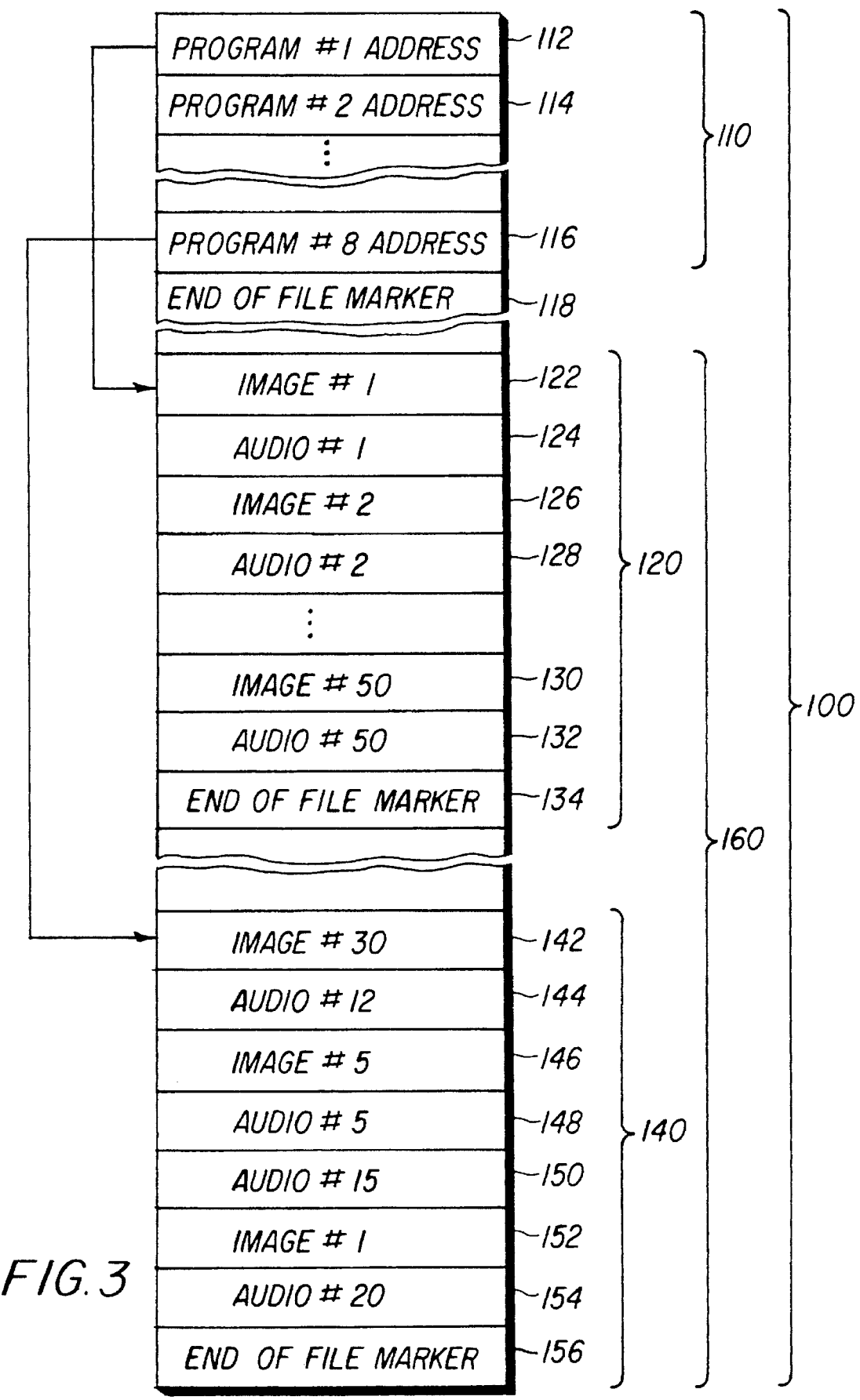
FIG. 3 is a schematic representation of a presentation sequences file according to a first embodiment of the invention.

FIG. 3 illustrates the organization of data contained within the presentation sequences file 100 on the disc 4 or the EEPROM memory module 29 in accordance with a first embodiment of the invention. The data is divided into two sections, a pointer table section 110 and a presentation sequence section 160. The pointer table 110 stores a multiplicity of pointer entries for a multiplicity of different presentations which may be constructed using the images and audio sequences contained on the disc 4. The pointer table 110 includes the addresses within the presentation sequences file of the first image for each of the multiplicity of different presentations. For example, the Program #1 address stored in location 112 of the presentation sequences file contains the address of location 122, which stores the disc image number of the first image for Program #1, which in this case is also the first image on the disc, image #1. Likewise, the Program #8 address stored in location 116 of the presentation sequences file contains the address of location 142, which stores the disc image number of the first image for Program #8, which in this case is image #30.

The presentation sequence section 160 contains a multiplicity of sequences such as sequence 120 and sequence 140. In particular, there is one sequence for each of the Programs listed in the pointer table 110. The sequence 120 contains a sequential order of images and audio segments for Program #1, and the sequence 140 contains a sequential order of images and audio segments for Program #8. The sequence 120 contains entries 122–132 which lists all of the images and audio segments on the disc, in sequential order, with each audio file number following the appropriate image file number. When the user selects Program #1, the player will therefore play back all of the images and associated audio segments on the disc, in the order in which the images appear. The sequence 140 contains entries 142–154 which lists the images in a different order from that of sequence 120, and does not include all of the image numbers. The sequence 140 also associates audio segments with images of different numbers, such as entries 142 and 144, which associate audio segment #12 with image #30. The sequence 140 further associates multiple audio segments with one image, such as entries 146–150, which associate image #5 with audio segment #5 and also with audio segment #15. When the user selects Program #8, the player displays image #30 while playing audio segment #12, it then displays image #5 while playing audio segment #5 followed by audio segment #15, and finally it displays image #1 while playing back audio segment #20.

Figure 4:
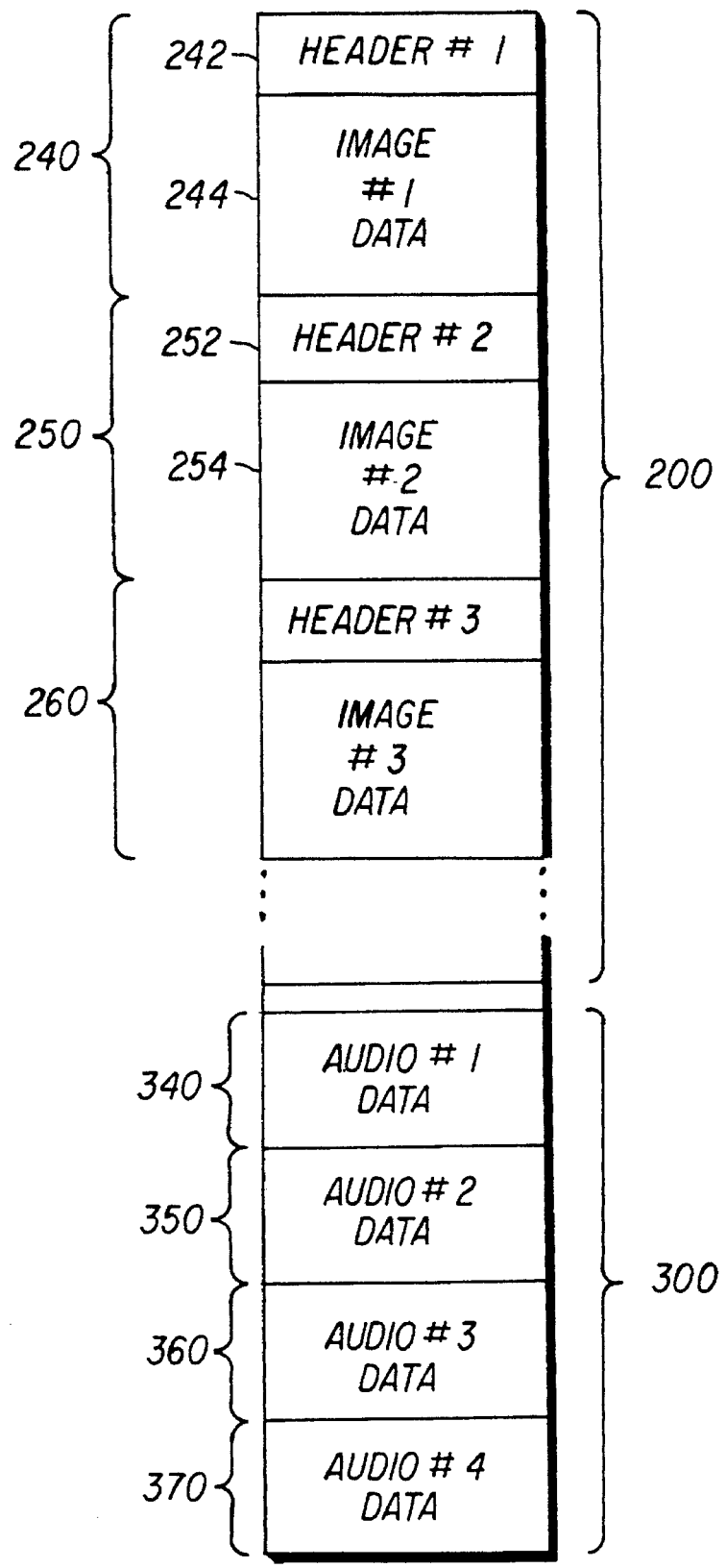
FIG. 4 is a schematic representation of the image data files and audio data files on the digital storage medium of FIG. 1.

FIG. 4 represents the image data files 200 and the audio data files 300 stored on disc 4. Each image file, for example image file 240 which contains the data representing image #1, includes both header information, such as header 242 and image data, such as image data 244. The image data file 244 is a very large file, since it contains the digital image data scanned from an image on filmstrip 10. The header information includes additional presentation control information for each image as described in the aforementioned Parulski '265 patent application. There can be a different number of audio segment files 340, 350, 360, 380, etc. than there are image files 240, 250, 260 etc. recorded on disc 4.

The image numbers and audio numbers in presentation sequences file 100, such as Image #1 in location 122 and Audio segment #1 in location 124 provide the location of where the data for the appropriate image or audio segment is located on the disc 4. In one implementation, this is done directly, by storing the actual address of the location on disc 4 where the image data file or audio data file begins. For example, location 122 of presentation sequences file 100 would contain the first address of Image #1 header 242 on disc 4. In a second implementation, the image numbers and audio numbers in presentation sequences file 100 would indirectly provide the location of where the data for the appropriate image or audio segment is located on the disc 4, by providing the image number or audio segment number. An intermediate table containing the actual addresses of the location on disc 4 where the image data files and audio data files begin is then used to determine the starting location of the appropriate audio or data file on disc #4.

In a system employing the file 100 shown, a user input device 38 includes multiple push-buttons respectively corresponding with the multiple sequences contained in presentation sequences file 100, for example, sequences 120 and 140. Each push button is labeled so as to inform the user about what information is contained in each sequence. When the user pushes one of the buttons, the controller 26 receives a signal so indicating. In response to the signal, controller 26 accesses the corresponding sequence in the presentation sequences file 100 by its pointer entry in pointer table 110. The controller employs a pointer or other suitable program means for keeping its place in the program sequence section 160. As the pointer moves through the program sequence, the controller 26 reads the image IDs, one at a time. For each image ID, the controller 26 then goes to a file in FIG. 4, and reads the header and the image data file. Once the image has been read into image memory 32, controller 26 identifies the audio data files which follow the image file, and reads the audio files. The audio messages are played back while the image is displayed.

The controller 26 keeps displaying the image as long as the audio message file is being read. Afterward, the image continues to be displayed for a few seconds while the next image is located from presentation sequences file 100. Alternately, a longer period of silence could be inserted between the end of the audio message and the beginning of a new image and an audio message.

In this manner, each image of a sequence is displayed, one by one, and each associated audio message is played back, until the end of the file marker is reached. At that point, the system returns to a quiescent state until the next button is pushed.

Figure 5:
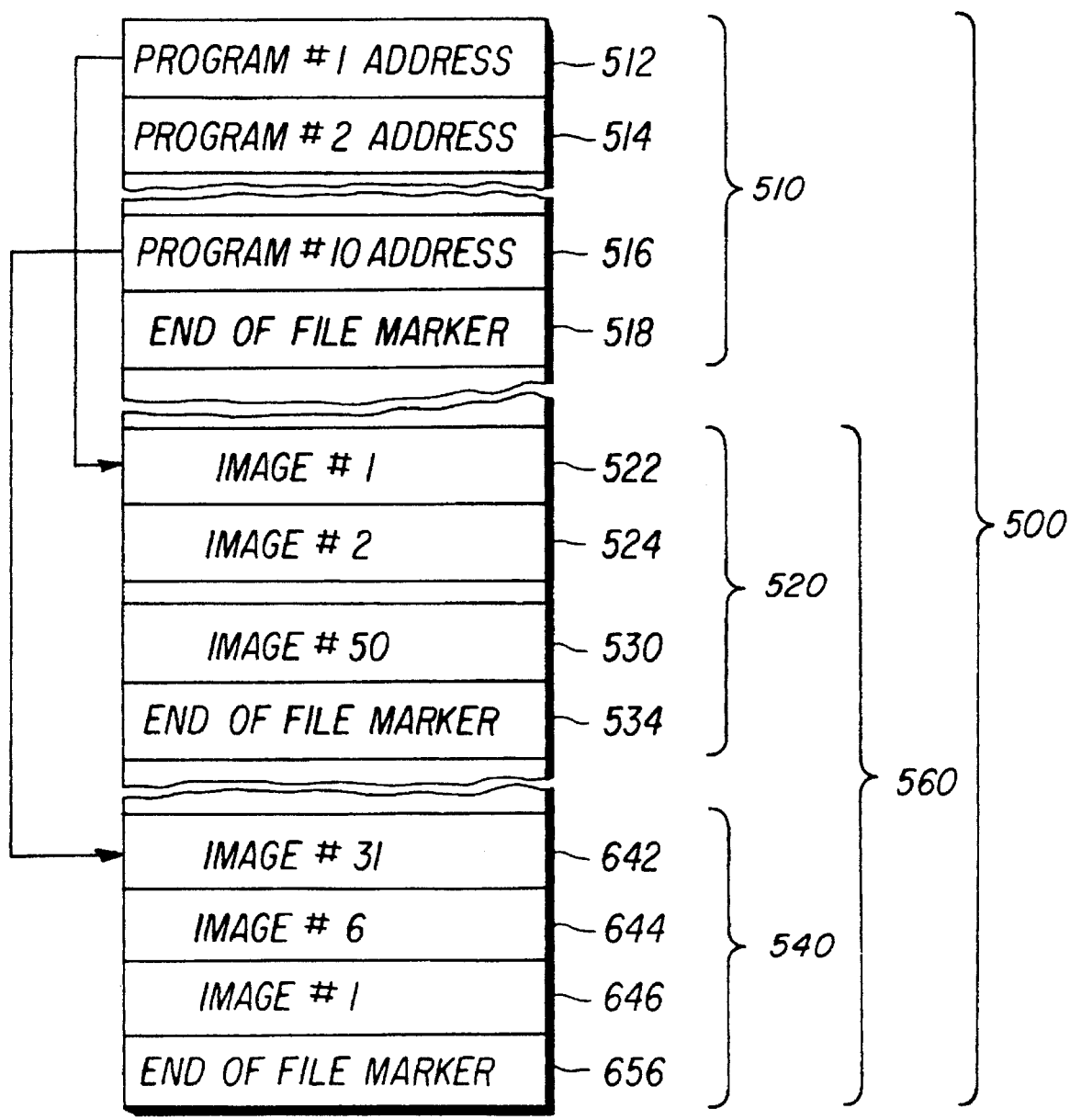
FIG. 5 is a schematic representation of a presentation sequences file according to a second embodiment of the invention.

FIG. 5 illustrates the organization of data contained within a presentation sequences file 500 on the disc 4 or the EEPROM memory module 29 in accordance with a second embodiment of the invention. In this embodiment, the presentation sequences file is also divided into two sections, a pointer table section 510 and a presentation sequence section 560. The pointer table 510 again stores a multiplicity of pointer entries for a multiplicity of different presentations which may be constructed using the images and audio sequences contained on the disc 4. The presentation sequence section 560 again contains a multiplicity of sequences such as sequence 520 and sequence 540. In particular, there is one sequence for each of the Programs listed in the pointer table 510.

The sequences now contain only image numbers, and the audio files which are played back as each image is displayed have the same file number as the image file number. Alternately, the audio file numbers could be contained within the header for each image number. For example, the audio segment for Image #1 would be indicated in the header #1 242 in FIG. 4. The sequence 520 contains a sequential order of images for Program #1, and the sequence 540 contains a sequential order of images and audio segments for Program #10. The sequence 520 contains entries 522–530 which lists all of the images on the disc, in sequential order. When the user selects Program #1, the player will therefore play back all of the images and associated audio segments on the disc, in the order in which the images appear. The sequence 540 contains entries 542–546 which lists the images in a different order from that of sequence 520, and does not include all of the image numbers. In this implementation, it is not possible to associate more than one audio segment with a single image file.

While I have shown and described an embodiment in accordance with the present invention, it is to be understood that the invention is not limited thereto, but is susceptible to numerous changes and modifications as known to a person skilled in the art. I therefore do not wish to be limited to the details shown and described herein, but rather intend to cover all such changes and modifications as are obvious to one of ordinary skill in the art.

What is claimed:

1. An apparatus for use with a system including a digital data base for storing respectively corresponding digitized still images in image data files and digitized audio messages in audio data files, for controlling concurrent reproduction of digitized images on an image reproduction device and audio information on a sound reproduction device, said apparatus comprising:

means for providing user input commands;

means, responsive to a single user command from said means for providing user input commands, for selecting and reading a sequence of digitized still images from the image data files in an ordered sequence established in a presentation sequences file and coupling said selected sequence of digitized still images to an image signal output for display on the image reproduction device;

means for identifying a plurality of sequences of digitized audio messages associated with a plurality of sequences of digitized still images, some of said digitized audio messages being associated with different digitized still images in different sequences, said plurality of sequences of digitized audio messages including a selected sequence of digitized audio messages which are to be played back in an ordered sequence also established in the presentation sequences file and concurrently with the display of said selected sequence of digitized still images; and means for reading said selected sequence of digitized audio messages from the audio data files and coupling the audio information to an audio signal output for playback on the sound reproduction device concurrent with the display of the associated sequence of digitized still images on said image reproduction device.

2. An apparatus as recited in claim 1, wherein said presentation sequences file is stored in the digital data base and includes a list of image data file IDs and audio data file IDs associated therewith; and said means for identifying includes:

a controller including means for reading image and audio data files whose IDs appear in the presentation sequences file, and displaying the image and playing back the audio message respectively digitized herein.

3. An apparatus as recited in claim 2, wherein the presentation sequences file includes a plurality of pairs of IDs, each pair of IDs including a first ID of an image data file and a second ID of an audio data file associated with the image data file.

4. An apparatus as recited in claim 1, wherein said said presentation sequences file includes a plurality of groups of IDs defining a plurality of different presentation sequences and wherein each presentation sequence defines a selection including multiple images and associated audio messages for the multiple images.

5. An apparatus as recited in claim 2, wherein the data base includes:

a first library of image data files, each image data file having an ID and including a header and digitized image data; and a second library of audio data files, each audio data file having an ID and including a header and digitized audio data.

6. An apparatus as recited in claim 5, wherein each image data file header includes the ID of an associated audio data file.

7. An apparatus as recited in claim 5, wherein said presentation sequences file includes pairs of data file IDs, each pair including a first ID for an image file and a second ID for an associated audio data file.

8. An apparatus as recited in claim 2, wherein the presentation sequences file is stored in a digital data base.

9. An apparatus as recited in claim 8, wherein the presentation sequences file is stored in a separate EEPROM memory.

10. An apparatus as recited in claim 9, wherein the EEPROM memory is removable.

11. An apparatus as recited in claim 5, wherein said presentation sequences file contains multiple sequences of IDs for images which are to be displayed in sequences responsive to user commands.

12. An apparatus as recited in claim 11, wherein:

the apparatus further comprises multiple manually operated controls respectively corresponding with the multiple sequences; and the means for identifying further include means for reading the image and audio data files making up a selected sequence responsive to an actuation of the respective manually operated control by a user.

13. An apparatus as recited in claim 11, wherein the means for reading and coupling image data include means for displaying each image of the sequence for a length of time required for playing back the audio message associated with the image.

14. An apparatus as recited in claim 11, wherein the means for reading and coupling image data and audio data further include means for pausing for a predetermined time between successive images of the sequence.

15. An apparatus according to claim 1 wherein said means responsive to a single user command includes a plurality of user input command buttons for selecting said sequence of digitized images.

16. An apparatus as recited in claim 1, wherein a plurality of different audio messages can be associated with a given sequence of digitized images.

17. An apparatus according to claim 2 wherein the digital data base and the presentation sequences file are stored on a compact disc.

18. An apparatus according to claim 2 wherein the digital data base is stored on a compact disc and the presentation sequences file is stored in an EEPROM memory.

19. An apparatus, for use with a system including a digital data base for storing image data files containing digitized still images and audio data files containing digitized audio messages, for controlling concurrent reproduction of digitized still images on an image reproduction device and audio information on a sound reproduction device, the apparatus comprising:

means for providing user input commands;

a digital data base reader for reading sequences of digitized images and audio messages in an order established by a presentation sequences file which associates the digitized images and audio messages in ordered sequences, wherein a given digitized image in two or more sequences is associated with different digitized audio messages;

a controller coupled to the digital data base reader for directing the reader to read a selected sequence of digitized still images and associated audio messages responsive to a single user command from said means for providing user input commands and further coupled to an output for providing the selected sequence of digitized images and audio messages respectively thereto, for display and playback.

20. An apparatus as recited in claim 19, wherein each image data file and each audio data file has an ID.

21. An apparatus as recited in claim 20, wherein the header of each image data file further contains the ID of an associated audio data file to be played back concurrently with the display of said image data file.

22. An apparatus as recited in claim 20, wherein said presentation sequences file lists a series of groups of data file IDs, each group including an image data file ID and one or more associated audio data file IDs.

23. An apparatus as recited in claim 22, wherein the presentation sequences file is stored in a digital data base.

24. An apparatus as recited in claim 23, wherein the presentation sequences file is stored in a separate EEPROM memory.

25. An apparatus as recited in claim 23, wherein the EEPROM memory is removable.

26. An apparatus as recited in claim 20, wherein the ID for each data file is related to its address in the data base.

27. An apparatus as recited in claim 20, wherein the ID for each image data file is related to one of a first sequence of integers, and the ID for each audio data file is related to one of a second sequence of integers.

28. An apparatus as recited in claim 20, wherein said presentation sequences file contains multiple sequences, each sequence including at least one data file ID, data file IDs of each sequence being in a predetermined order, so that, responsive to a single user command selecting a sequence, images and associated audio messages of said sequence are displayed and played back in an order corresponding with the order of data file IDs in the selected sequence.

29. An apparatus as recited in claim 28, wherein each sequence within presentation sequences file is associated with a pointer table entry.

30. An apparatus as recited in claim 29, wherein each sequence within the presentation sequences file includes an end-of-sequence delimiter.

31. An apparatus as recited in claim 19, wherein the digital data base includes a digital optical disc, and the digital data base reader includes a laser pickup.

32. A method for operation of a system including a digital data base for storing respectively corresponding digitized images in image data files and digitized audio messages in audio data files to control concurrent reproduction of digitized images on an image reproduction device and audio information on a sound reproduction device, the method comprising the steps of, in response to a single command provided to said system by a user:

reading a digitized image from a selected one of the image data files in an ordered sequence established in a presentation sequences file and coupling the digitized image to an image signal output for display on the image reproduction device;

mapping the image data files to the audio data files in an ordered sequence in the presentation sequences file such that a given digitized image may be associated with more than one digitized audio message;

identifying one or more audio data files containing digitized audio messages associated with said digitized image in the presentation sequences file and which are to be played back concurrently with the display of the digitized image;

reading said digitized audio messages from the associated audio data file and coupling the audio information to an audio signal output for display on the sound reproduction device concurrent with the display of said digitized image on said image reproduction device; and repeating the steps of reading and coupling the digitized image, identifying an associated audio file, and reading and coupling the audio information a plurality of times to display a sequence of digitized images and play back a sequence of respectively associated audio messages.

33. A method as recited in claim 32, wherein the step of reading and coupling the digitized image includes reading the image data file from a first region of memory space in the data base; and the step of identifying an associated audio file includes identifying a second region of memory space in the digital data base.

34. A method as recited in claim 32, wherein the step of identifying an associated audio file includes reading a header associated with the image data file and extracting an audio file ID from the header.

35. A method as recited in claim 32, wherein the step of identifying an associated audio file includes reading a pair of file IDs from said presentation sequences file, the pair including a first ID of the image data file and a second ID of the associated audio data file.

36. A method as recited in claim 35, wherein the presentation sequences file is stored in a digital data base.

37. A method as recited in claim 36, wherein the presentation sequences file is stored in a separate EEPROM memory.

38. A method as recited in claim 37, wherein the EEPROM memory is removable.

39. A method as recited in claim 32 further comprising the step of pausing for a predetermined time between successive images of said sequence.

* * * * *

UNITED STATES PATENT AND TRADEMARK OFFICE
CERTIFICATE OF CORRECTION

PATENT NO. : 5,555,098
DATED : September 10, 1996
INVENTOR(S) : Kenneth A. Parulski It is certified that error appears in the above-indentified patent and that said Letters Patent is hereby corrected as shown below:

Col. 1, line 63     -- 5,246,659 --. The correct patent number is "5,241,659"

Signed and Sealed this

Sixteenth Day of September, 1997

Attest:

BRUCE LEHMAN

Attesting Officer     Commissioner of Patents and Trademarks